(12) United States Patent
Grob et al.

(10) Patent No.: US 6,458,059 B1
(45) Date of Patent: Oct. 1, 2002

(54) GEAR BOX UNIT FOR A MOTOR VEHICLE

(75) Inventors: Ferdinand Grob, Besigheim; Juergen Loeffler, Winnenden; Martin-Peter Bolz, Oberstenfeld; Holger Huelser, Stuttgart, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/601,425

(22) PCT Filed: Nov. 23, 1999

(86) PCT No.: PCT/DE99/03714

§ 371 (c)(1),
(2), (4) Date: Sep. 22, 2000

(87) PCT Pub. No.: WO00/32957

PCT Pub. Date: Jun. 8, 2000

(30) Foreign Application Priority Data

Dec. 3, 1998 (DE) .......................... 198 55 790

(51) Int. Cl.$^7$ ................................. B60K 1/02
(52) U.S. Cl. ........................................ 477/3
(58) Field of Search ............... 74/15.4, 15.66, 74/15.84, 336 R, 661; 475/5; 477/3, 15; 180/65.4, 65.6, 65.7

(56) References Cited

U.S. PATENT DOCUMENTS

| | | | |
|---|---|---|---|
| 3,354,729 A | * 11/1967 | Marquart | .................. 74/15.84 |
| 4,862,009 A | 8/1989 | King | |
| 4,939,949 A | * 7/1990 | Langenberg | ............... 475/5 X |
| 5,080,635 A | * 1/1992 | Martinez et al. | ................ 475/5 |
| 5,558,589 A | * 9/1996 | Schmidt | ......................... 475/5 |
| 5,562,566 A | * 10/1996 | Yang | .............................. 477/3 |
| 5,730,676 A | * 3/1998 | Schmidt | ......................... 475/5 |
| 5,755,303 A | * 5/1998 | Yamamoto et al. | .......... 477/3 X |
| 6,019,183 A | * 2/2000 | Shimasaki et al. | ...... 180/65.4 X |
| 6,020,697 A | * 2/2000 | Shimasaki et al. | ...... 180/65.4 X |

FOREIGN PATENT DOCUMENTS

| | | |
|---|---|---|
| DE | 43 35 771 C | 3/1995 |
| DE | 197 45 997 A | 11/1998 |
| EP | 0 391 386 A | 10/1990 |
| EP | 0 930 193 A | 7/1999 |
| JP | 404274926 | * 9/1992 ................... 477/33 |

OTHER PUBLICATIONS

Patent Abstract of Japan vol. 012, No. 428 (M–762), Nov. 11, 1988 & JP 63 162957 A (Hino Motors Ltd), Jul. 6, 1988.

* cited by examiner

*Primary Examiner*—Charles A Marmor
*Assistant Examiner*—Roger Pang
(74) *Attorney, Agent, or Firm*—Michael J. Striker

(57) ABSTRACT

To avoid unnecessary energy consumption and to improve king performance, in a transmission unit for a motor vehicle, having a drive train (4, 8, 5) which is intended for coupling to an internal combustion engine (1) on the one hand and wheels (6) of the vehicle on the other, and having an electrical machine (9) and a transmission (7), which constructed for torque transmission from the electrical machine (9) to the drive train (4, 8, 5) and vice versa, it is provided that the transmission (7) has an idling switching state, in which no torque transmission from the electrical machine (9) to the drive train (4, 8, 5) occurs. For controlling the switching states, a control circuit (11) is provided, which preferably operates by an automatic method.

10 Claims, 2 Drawing Sheets

GEAR BOX UNIT FOR A MOTOR VEHICLE

BACKGROUND OF THE INVENTION

The present invention relates to a transmission unit for a motor vehicle, having an electrical machine that acts as both a starter for the engine and a generator. More precisely, the invention relates to a transmission unit for a motor vehicle with a drive train that is intended for coupling to an internal combustion engine on the one hand and to the wheels of the vehicle on the other, and having an electrical machine and a transmission, which is constructed for transmitting torque from the electrical machine to the drive train and vice versa.

Such transmission units are known, but despite their advantages such as weight, space and cost reduction that are associated with the omission of an electrical machine, they have still not become widely established.

In modern motor vehicle, separate starters and generators are typically always installed. The starters are shifted via a thrust wheel only as needed, and as a result their moment of inertia as no effect on the dynamics of the drive train. Modern generators are typically connected to the engine crankshaft via pulleys, and their rpm therefore closely follows that of the crankshaft. As a result, each time the engine is braked, torque is transmitted back from the generator to the drive train, and in other words the generator is unnecessarily braked as well. In this way, energy is uselessly lost upon each braking, and furthermore the rigidly coupled generator that also rotates increases the braking moment that has to brought to bear, which is also undesirable.

To solve this problem, internal combustion engine and generator units have been developed in which so-called free-wheel pulleys are used. These free-wheel pulleys decouple the generator if the generator shaft rpm is (even only briefly) above the crankshaft rpm of the engine at the same instant.

These free-wheel pulleys therefore permit a torque transmission only from the engine to the generator, but not vice versa. They are accordingly unsuitable for an electrical machine that is intended to act as both a starter and a generator.

SUMMARY OF THE INVENTION

A transmission unit for a motor vehicle is created that makes it possible to unite the functions of the starter and the generator in a single electrical machine, and nevertheless it offers the advantages in terms of effective braking and the avoidance of energy losses that can be attained, in conventional generators coupled to an internal combustion engine, by the known free-wheel pulleys.

The transmission of a unit of this kind expediently has two operational switching states, one for the torque transmission via the drive train to the electrical machine and one for the transmission in the opposite direction, which states differ in their gear ratios.

Expediently, a control circuit is provided, which as a function of a detected deceleration of the motor vehicle puts the transmission into the idling switching state without further human action. To that end, the control circuit advantageously monitors the rpm of the drive train. This can be done directly or indirectly, for instance by monitoring the rotary speeds of the wheels of the motor vehicle. To that end, the control circuit can cooperate with an ABS control unit.

Whenever the exceeding of a predetermined acceleration of the motor vehicle is detected in this way, the control circuit puts the transmission in the idling switching state. This decouples the electrical machine from the drive train so that it need not follow the braking of the drive train. Instead, kinetic energy stored in the rotating parts of the electrical machine can continue to be used for generating current.

The control circuit furthermore expediently also monitors the rpm of the electrical machine, and it switches the transmission back from the idling switching state to an operational switching state when this rpm drops below a limit value. For determining this rpm, a signal of a frequency converter can be used; such a converter is typically connected to the electrical machine of a transmission unit of the type defined at the outset, in order to rectify the current generator by the electrical machine and enable its storage by a vehicle battery.

The limit value below which the control circuit shifts the transmission back to the operational switching state is advantageously defined dynamically and in proportion to the ascertained rpm of the shaft, on the side toward the drive train, of the transmission. The idling switching state is maintained until such time as the electrical machine rotates faster than what corresponds, taking into account the gear ratio of the operating, or operational, state, to the rpm of the shaft, toward the drive train, of the transmission. Not until the rpm of the electrical machine has dropped below this value, either because it has been braked by generation of electrical power or because the vehicle is being accelerated again, is a switch back to the operating state made. This precludes an undesired torque transmission from the electrical machine to the drive train.

Further characteristics and advantages of the invention will become apparent from the ensuing description of an exemplary embodiment.

BRIEF DESCRIPTION OF THE DRAWINGS

Shown are.

DETAILED DESCRIPTION OF THE PREFERRED EMBODIMENT

Figure 1:
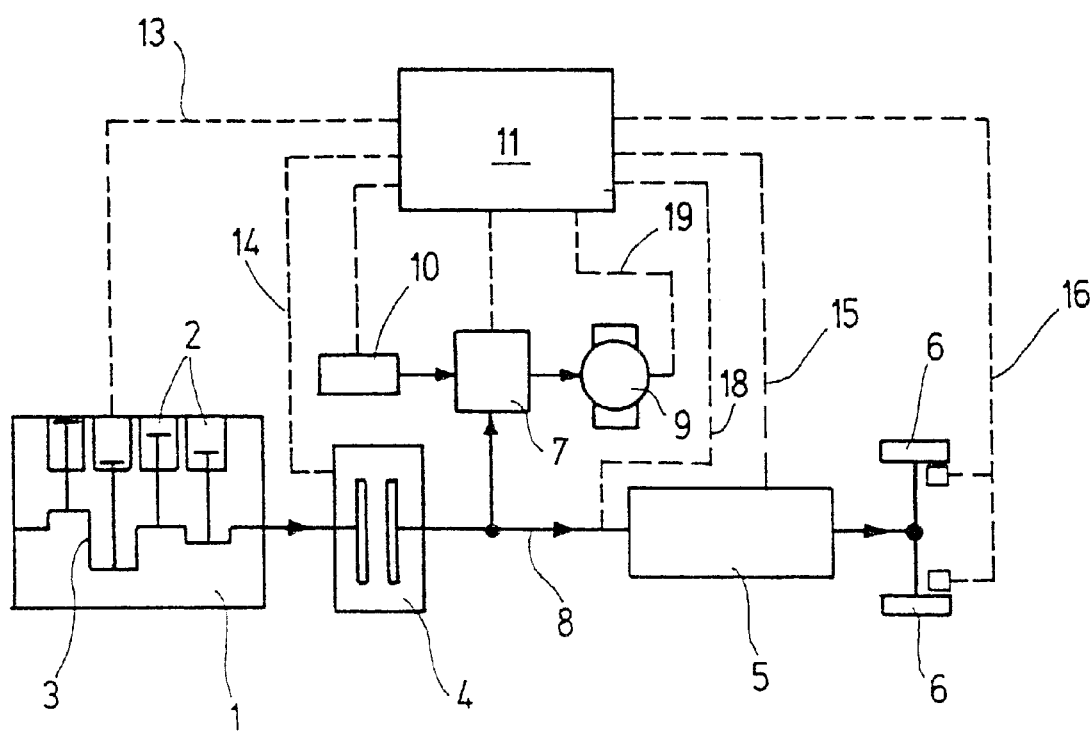
FIG. 1, a block diagram of a transmission unit according to the invention, with its various functional elements and flows of signals and torque among them.

FIG. 1, in the form of a highly schematic block diagram, shows an internal combustion engine 1 with a plurality of cylinders 2, which engage a crankshaft 3 and which, via a drive train, drive wheels 6 of a motor vehicle. The drive train here includes, in a known manner, a main clutch 4 and a vehicle transmission 5, at which various speeds of the vehicle can be set, and a shaft 8 connecting these two functional elements. The layout of a drive train of this kind is well-known and need not be described in detail here.

A transmission 7 has one shaft coupled to the drive shaft 8 of the vehicle transmission 5 and one shaft coupled to an electrical machine 9. An actuator 10 regulates the switching state of the transmission 7 as a function of a control signal received from a control circuit 11. The switching state of the transmission 7 can be an idling state, in which no torque transmission whatever takes place between the drive train and the electrical machine 9, or one of two operating states, which differ in their gear ratio, one of them corresponding to operation of the electrical machine as a generator and the other to operation as a starter for the engine 1. For the gear ratios, examples of suitable values are 1 to 3 and 1 to 18; that is, in the first operational switching state, in the generator mode, the electrical machine 9 is driven by the engine 1 and executes three revolutions per revolution of the drive shaft 8, while conversely in the second operational switching state, the electrical machine 9 is used with 18 revolutions per revolution of the drive shaft 8, for starting the engine 1. The transmission 7 can be a manual transmission known per se with a clutch, or a planetary gear, or the like.

The control circuit 11 receives signals from many of the functional elements shown in the drawing and sends control signals to them. The lines over which these signals are received and sent are represented as arrows drawn in dashed lines, in contrast to the solid-line arrows such as that for the drive shaft 8, which indicate a transmission of a mechanical force or a torque.

For instance, the control circuit receives the engine rpm or rpm of the crankshaft 3, $n\_mot$, over a line 13; the state on or to the main clutch 4 over a line 14; a signal that indicates the gear selected $g\_ist$ over a line 15; the rotary speeds $n\_rad$ of the wheels 6 over a line 16; the present switching state of the transmission 7 over a line 17; the input rpm of the transmission 5 over a line 18; which in this case is equal to the rpm of the drive shaft 8; and the rpm $n\_sg$ of the shaft of the electrical machine 9 over 19. This rpm $n\_sg$ is expediently ascertained from the frequency of the alternating voltage generated by the electrical machine 9; a circuit for detecting this rpm may be included, in particular in a frequency converter of the electrical machine. Over a line 20, commands for the actuator 10 of the transmission 7 are sent.

Figure 2:
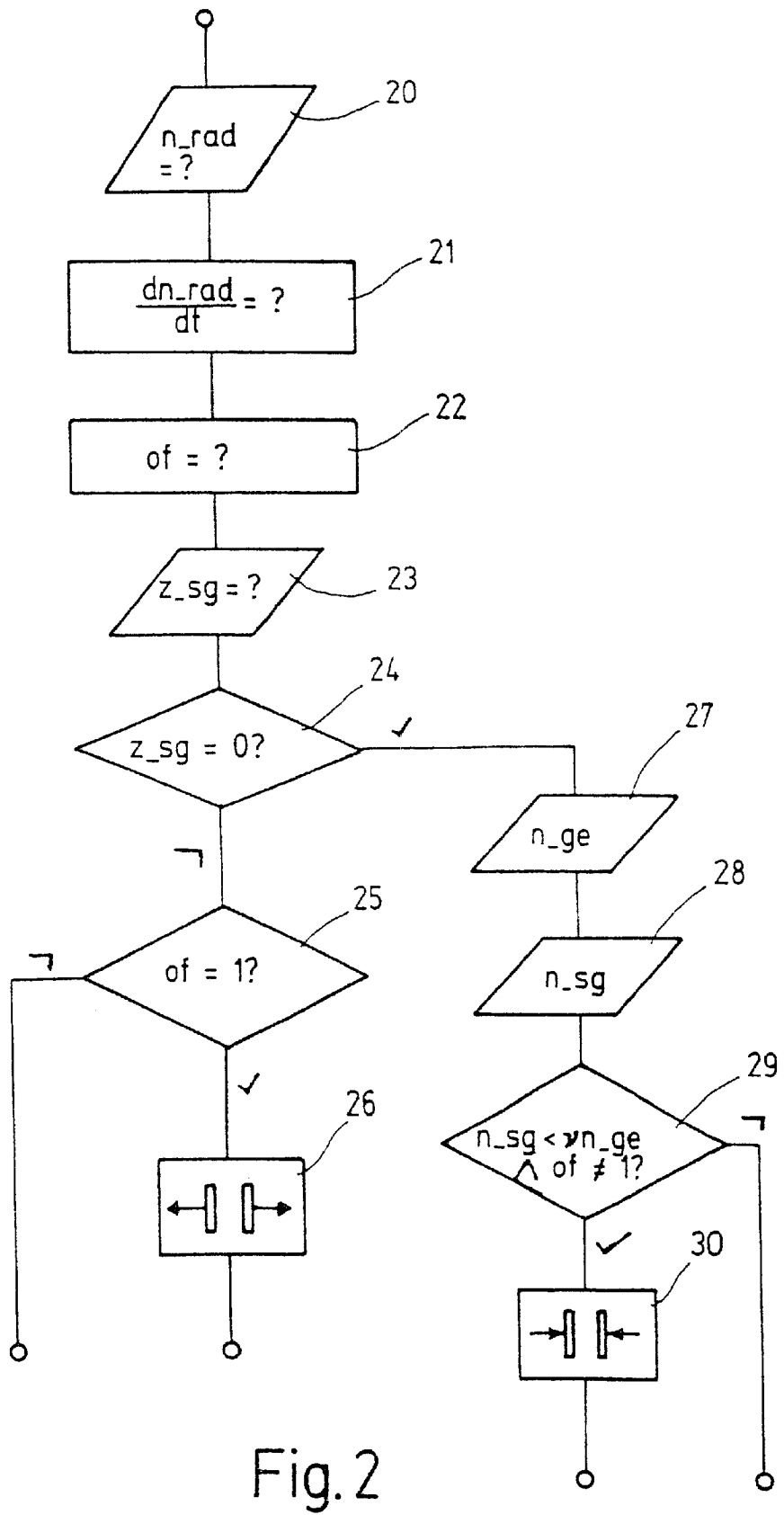
FIG. 2, a flow chart of a method for operating the transmission unit of FIG. 1.

FIG. 2 shows a flow chart of a method executed by the control circuit 11. The control circuit 11 repeats this method cyclically, as long as the engine 1 is in operation. First, in step 20, it determines the rotary speed $n\_rad$ of a wheel or the wheels of the motor vehicle, and optionally an average value over a plurality of wheels is determined. For determining the wheel speeds, rpm sensors of an anti-lock braking system (ABS) can be used, of the kind that are present in many modern motor vehicles. This keeps the additional costs for executing the present invention low.

Alternatively, other rotary speeds of the drive train can be detected, such as the rpm $n\_ge$ of the drive shaft 8, and processed in the same way as described below, taking the wheel speed $n\_rad$ as an example.

In step 21, the control circuit calculates the derivation over time $dn\_rad/dt$ of the wheel speed $n\_rad$. If this derivation is negative, or in other words indicates that the vehicle is slowing down, and is below limit value that can be dependent on the present rpm and can be stored in memory in a table in the control circuit 11, then the control circuit in step 22 sets a variable "of" to the value of 1. If the derivation is above the limit value or equal to it, then "of" is set equal to 0.

In step 23, the control circuit detects the switching state of the transmission 7 and assigns the value of 0 to a variable $z\_sg$, if the transmission is in the idling switching state, and the value 1 or 2, for instance, if it is in the first or the second operational switching state, respectively.

If the transmission 7 is not in the idling switching state, then in step 25 the value of the variable "of" is called up. If this value is equal to 1, then with the aid of the actuator 10 the control circuit 11 puts the transmission 7 in the idling switching state. This process is indicated in the drawing at step 26 by two clutch plates that are moving apart. After that, the method returns to the starting point, and the cycle is repeated.

If it is found in step 25 that "of" is not equal 1, then the method returns directly to the starting point.

If in step 24 the transmission 7 is in the idling switching state, or in other words if $z\_sg$ is equal to 0, then the method jumps to step 27, in which the rpm $n\_ge$ of the drive shaft 8 is measured. Next, in step 28, the rpm $n\_sg$ of the shaft of the electrical machine is determined as well. In step 29, the control circuit compares $n\_sg$ with a limit value $vn\_ge$, and the proportionality factor v corresponds to the gear ratio of the transmission 7 in the present switching state, or in other words amounts to one-third, for example, in the first operational switching state. The proportionality factor can also be selected to be slightly less than the gear ratio, in order to avoid frequent switching back and forth between the switching states in a relatively long-lasting braking event.

If the comparison in step 29 shows that $n\_sg$ is less, this means that the shaft of the electrical machine is rotating more slowly than would be the case if the electrical machine 9 were solidly coupled to the drive shaft 8 via the transmission 7. If that is the case and if at the same time the variable "of" is not equal to 1, or in other words the vehicle is not being braked sharply, then the control circuit 11 causes the actuator 10 to put the transmission back into an operating switching position, which is represented by two clutch disks moving toward one another in step 30.

If conversely the comparison in step 29 shows that $n\_sg$ is greater, this means that the shaft of the electrical machine is rotating too fast in proportion to the drive shaft 8, so that a coupling of the two via the transmission 7 would lead to a torque transmission to the drive shaft 8, which is undesired, since that draws energy from the electrical machine 9 and at the same time impairs the braking event of the vehicle. In that case, the method returns directly to the starting point, and the transmission 7 remains in the idling switching position.

The same thing happens if "of" is equal to 1, or in other words if the deceleration of the vehicle determined in step 21 is so pronounced that it justifies keeping the idling switching state in force.

What is claimed is:

1. A transmission unit for a motor vehicle, having a drive train which is intended for coupling to an internal combustion engine (1) on the one hand and wheels (6) of the vehicle on the other hand, and having an electrical machine (9) and a transmission (7), which is constructed for transmitting torque from the electrical machine (9) to the drive train (4, 8, 5) and vice versa, characterized in that the transmission (7) has an idling switching state, in which no torque transmission between the drive train (4, 8, 5) and the electrical machine (9) occurs, and further comprising a control circuit (11), which as a function of a detected deceleration of the motor vehicle switches the transmission (7) to the idling switching state, wherein the control circuit (11) monitors the rpm ($n\_sg$) of the electrical machine (9) and cancels the idling switching state if this rpm drops below a lower limit value.

2. The transmission unit of claim 1, characterized in that the transmission has two operating switching states for the torque transmission to the electrical machine (9) and to the drive train (4, 8, 5), respectively, which differ in their gear ratios.

3. The transmission unit of claim 1, characterized in that the control circuit (11), to detect the deceleration, monitors a rotary speed of the drive train, wherein the rotary speed is a wheel rpm ($n\_rad$).

4. The transmission unit of claim 1, characterized in that the control circuit (11), to detect the deceleration, cooperates with an ABS control unit.

5. The transmission unit of claim 1, characterized in that the control circuit (11), for monitoring the rpm ($n\_sg$) of the electrical machine (9), is connected to a frequency converter of the electrical machine (9).

6. The transmission unit of claim 1, characterized in that the control circuit (11) ascertains the rpm ($n\_ge$) of a shaft, on the drive train side, of the transmission (7) and defines the limit value dynamically proportionally to the ascertained rpm.

7. The transmission unit of claim 6, characterized in that a proportionality factor (v) is slightly less than or equal to the gear ratio of the transmission upon the torque transmission from the drive train (4, 8, 5) to the electrical machine (9).

8. A method for operating the transmission unit of claim 1, having the steps of:

monitoring an rpm ($n\_rad$) of the drive train;

switching over to the idling switching state, if a predetermined decrease in the rpm ($n\_rad$) of the drive train is detected;

monitoring the rpm ($n\_sg$) of the electrical machine (9); and switching over to an operational switching state if the rpm ($n\_sg$) drops below a limit value.

9. The method of claim 8, in which the rpm ($n\_ge$) of a shaft, toward the drive train, of the transmission (7) is ascertained, and a limit value is defined dynamically proportionally to the ascertained rpm of this shaft.

10. The method of claim 9, in which a proportionally factor (v) is slightly less than or equal to the gear ratio of the transmission upon the torque transmission from the drive train (4, 8, 5) to the electrical machine (9).

* * * * *